Figure 7:
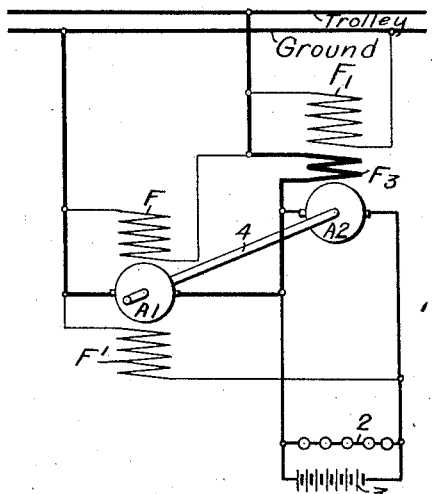

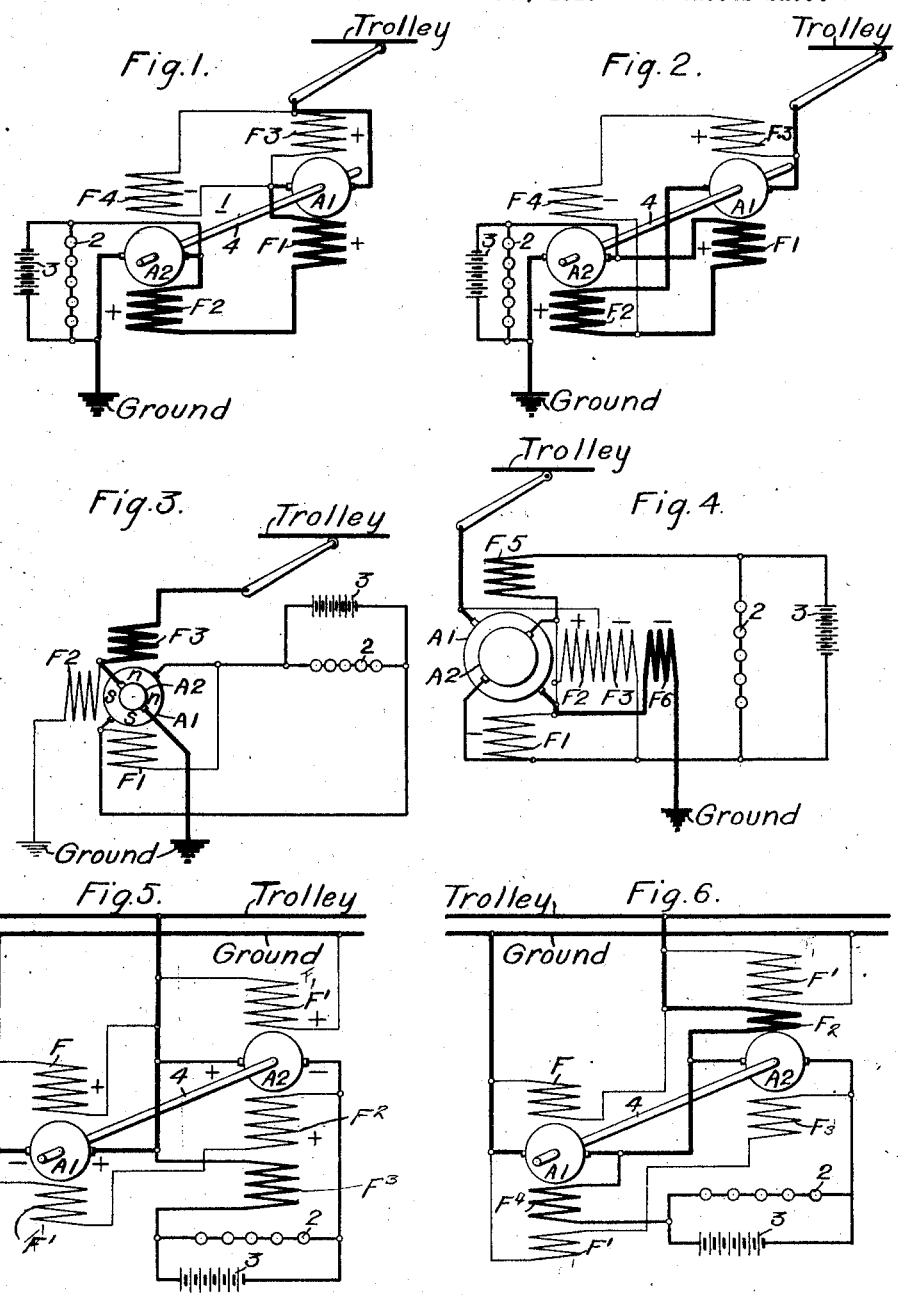

Nov. 27, 1923.

R. E. HELLMUND 1,475,822

ELECTRICAL SYSTEM

Filed June 18, 1919   2 Sheets-Sheet 2

WITNESSES:
J. A. Helsel
W. R. Coley

INVENTOR
Rudolf E. Hellmund
BY
Wesley G. Carr
ATTORNEY

Patented Nov. 27, 1923.

1,475,822

UNITED STATES PATENT OFFICE.

RUDOLF E. HELLMUND, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed June 18, 1919. Serial No. 305,107.

*To all whom it may concern:*

Be it known that I, RUDOLF E. HELLMUND, a citizen of the German Empire, and a resident of Pittsburgh, in the county of Allegheny and State of Pennsylvania, have invented a new and useful Improvement in Electrical Systems, of which the following is a specification.

My invention relates to electrical systems and especially to lighting systems for electric railway vehicles.

One object of my invention is to provide a relatively simple train-lighting system wherein a substantially constant secondary or delivered voltage of a motor-generator set or dynamotor is maintained, irrespective of the unavoidable fluctuations in the primary or supply-circuit voltage.

Another object of my invention is to provide a motor-generator set or a dynamotor, for train-lighting purposes, having a field winding for the generator armature that is energized in accordance with the difference between the motor and the generator voltages or between the primary and the secondary voltages of the motor-generator set.

Other objects of my invention will become evident from the following detailed description, taken in conjunction with the accompanying drawings, wherein—

Figure 1 is a diagrammatic view of a train-lighting system organized in accordance with the present invention; and Fig. 2 to Fig. 10, inclusive, are diagrammatic views of modifications thereof.

Referring to Fig. 1 of the drawings, the system shown comprises suitable supply-circuit conductors respectively marked "Trolley" and "Ground"; and a motor-generator set 1 that is driven from the supply circuit to provide a suitably low voltage to a load circuit, such as a plurality of car lamps 2. A storage battery 3 is connected across the terminals of the load circuit for the familiar purpose of further steadying the voltage applied thereto, under conditions of fluctuation of the main supply-circuit voltage.

The motor-generator set 1 comprises a motor armature winding $A^1$ which is mechanically connected to a generator armature winding $A^2$ by means of a shaft 4, for example, together with a plurality of field windings $F^1$ for the motor armature winding and $F^2$ for the generator armature winding that are connected between the armature windings and in series relation therewith, the entire armature circuit being connected to the supply-circuit conductors. Furthermore, shunt field windings $F^3$ and $F^4$ for the armatures $A^1$ and $A^2$, respectively, are connected to the terminals of the motor armature winding $A^1$, to thus be energized in accordance with the difference between the primary and the secondary voltages of the motor-generator set. The motor field windings $F^1$ and $F^3$ are cumulatively related, as indicated by the plus signs, while the generator field winding $F^4$ is differentially connected with respect to the associated field winding $F^2$, as also indicated by the negative and the positive signs.

The motor of the motor-generator set 1 is designed to be less magnetically saturated under given operating conditions than the generator armature $A^2$, for a purpose to be set forth. Assuming that, under normal line-voltage conditions, the generator armature $A^2$ delivers the desired secondary voltage to the lamp circuit 2, in the case of a sudden drop of the line voltage, it is evident that the electromotive force of the motor armature $A^1$ diminishes at a higher rate than the voltage of the generator armature $A^2$, by reason of the fact that the motor is less magnetically saturated than the generator, as previously mentioned. Consequently, the ampere-turns of the shunt field windings $F^3$ and $F^4$ are decreased more than proportionately to the drop in line voltage, since both of these field windings are connected across the motor armature $A^1$. Inasmuch as the generator field winding $F^4$ is differentially connected, it follows that an increase of flux in the generator armature $A^2$ will occur, while a relatively rapid reduction in the flux for the motor armature $A^1$ will simultaneously take place. In other words, the inherent tendency of the system is to maintain the generator voltage constant, while the motor voltage decreases at a higher rate than the supply-circuit voltage and compensates for the diminished difference between the supply-circuit voltage and the secondary electromotive force of the motor-generator set.

If desired, the field windings $F^3$ and $F^4$ may be connected in series relation across the motor armature $A^1$ to provide the same effect as that just described.

Fig. 2 discloses a system wherein the series field windings $F^1$ and $F^2$ are cross-connected between the armature windings $A^1$ and $A^2$, while the shunt field windings $F^3$ and $F^4$ are connected in series relation between the higher-voltage terminal of the motor armature $A^1$ and a point intermediate the series field windings $F^1$ and $F^2$. Consequently, the current traversing the shunt field windings $F^3$ and $F^4$ is again proportionate to the difference between the primary and the secondary voltages of the motor-generator set, and flows through the series field winding $F^1$ on its path to ground, but such current does not traverse the generator field winding $F^2$. In each case, therefore, a certain reduction in the necessary number of field-winding turns is permitted, because of the increased current in the motor field winding $F^1$ on the one hand and by reason of the fact that a slight decrease in the differential effect of the field winding $F^4$ is thereby permitted on the other hand.

Referring to Fig. 3, the principles of the present invention are shown as applied to a dynamotor of familiar general construction. The motor armature winding $A^1$ and the generator armature winding $A^2$ are wound upon the same core, as is customary practice in dynamotors, the sets of brushes for the respective armature windings being located in quadrature relation, or at some smaller angle. A plurality of field windings $F^3$ and $F^2$ are connected across the supply circuit and are likewise located in quadrature or other suitable relation, while a third field winding $F^1$ is connected across the motor armature winding and is placed in alined relation with the field winding $F^3$.

The field winding $F^1$ is thus excited in accordance with the substantially constant secondary voltage of the dynamotor, while the field winding $F^2$ is energized by the variable primary or supply-circuit voltage. The field winding $F^2$ assists in inducing a counter-electromotive force in opposition to the primary voltage but has a differential effect with respect to the secondary voltage by reason of the peculiar relation of the field winding to the sets of brushes for the respective armature windings. Whenever the line voltage increases, the total primary field flux is correspondingly augmented, while the total secondary field flux decreases, whereby the illustrated connections tend to counteract any increase of the generator voltage upon a rise in supply-circuit voltage. The converse effect takes place in the event of a reduction of line voltage or, in other words, a substantially constant secondary voltage is maintained throughout fluctuations of primary or supply-circuit voltage.

If desired, the series field winding $F^3$ or the shunt field winding $F^1$ may be omitted to provide a secondary voltage that is still approximately constant, but, in this case, a voltage regulation as close as that provided by the entire system illustrated in Fig. 3 is not, of course, obtained.

It may be mathematically demonstrated that the system shown in Fig. 4 provides a very close voltage regulation for the lamp circuit 2. The system comprises a dynamotor having the motor armature winding $A^1$ and the generator armature winding $A^2$, the brushes for the respective armature windings being again located in quadrature or other suitable relation, while a total of five field windings are employed. Field windings $F^2$ and $F^6$ are connected in series relation across the supply circuit and are differentially disposed, as indicated by the plus and minus signs. These field windings are located in alinement between adjacent non-corresponding brushes, that is, brushes connected to the different armature windings. A third field winding $F^3$ also has a differential effect with respect to the field winding $F^2$ and is placed in alinement therewith to be energized in accordance with the difference of the primary and the secondary voltages of the dynamotor, being connected between the higher-voltage terminal of the motor armature winding $A^1$ and the higher-voltage terminal of the generator armature winding $A^2$. The field winding $F^5$ is connected in series relation with the generator armature winding $A^2$ or, in other words, is located in the load circuit, while the remaining field winding $F^1$ is connected to the brushes of the generator armature winding. The field windings $F^1$ and $F^5$ are located in quadrature relation to the other three field windings and are differentially disposed, although both are indicated by the minus sign as of negative polarity, because of the illustrated location thereof on opposite sides of the dynamotor armature.

The field windings $F^5$ and $F^6$ may be designed to fully compensate for armature reaction in the dynamotor or to over or under-compensate such reaction to secure any desired load compound effect. However, if the effect of such armature reaction is not considered to be important, then the field windings $F^5$ and $F^6$ may be omitted.

Referring to Fig. 5, the motor armature winding $A^1$ and the generator armature winding $A^2$ are provided with shunt field windings $F$ and $F_1$, respectively, that are connected to the supply-circuit conductors. In addition, the generator armature $A^2$ has a field winding $F_2$ which is connected across the two armature windings to receive a voltage proportionate to the difference between the electromotive forces of the two armature windings. In this case the motor armature winding $A^1$ is also provided with a similar field winding $F'$. Furthermore, a load series field winding $F_3$ is provided for the generator armature winding.

In the present system, the motor and, preferably, also the generator, are designed for rather low magnetic saturation. Since the motor is shunt excited, the speed thereof will decrease only slightly with a drop in line voltage. The ampere-turns of the generator shunt field winding $F_1$ vary with the line voltage and those of the generator field winding $F^2$ with the difference of the armature-winding voltages, whereby the sum of such ampere-turns increases upon a decrease of line voltage. The product of the ampere-turns and of the speed is constant, whereby a substantially constant generator voltage under the relatively low-saturation conditions assumed is obtained, irrespective of fluctuations of supply-circuit voltage.

If desired, under certain favorable operating conditions, the field windings $F'$ and $F^3$ may be omitted. However, the motor field winding $F'$, which is influenced by the voltage difference of the armature windings, serves to increase the total motor field flux at a more rapid rate, upon a decrease of line voltage, than the flux increases when the field winding $F'$ is omitted. Such action will maintain the motor speed at the desired value, and the flux relations in the motor are thereby made such that a greater degree of magnetic saturation in the motor is permitted than is the case when the field winding $F'$ is omitted.

In Fig. 6, the system shown comprises the motor armature winding $A^1$ and the generator armature winding $A^2$, together with a set of three field windings $F$, $F_4$ and $F'$ for the motor armature $A^1$, and $F_1$, $F_3$ and $F_2$ for the generator armature $A^2$. The generator field winding $F_3$ is energized by the current traversing the armature winding $A^1$ and, consequently, the excitation provided by the field winding $F_3$ not only increases with an increase in load upon the motor-generator set but also in the case of decrease in line voltage, since the motor current is increased under constant-load conditions upon a reduction of supply-circuit voltage. The inductance of the field winding $F_3$ in the motor circuit is also beneficial, under starting conditions, to reduce the draft of current and also serves a similar purpose whenever the power is interrupted by reason of the trolley-pole leaving the wire, for example. In this way, the tendency of the motor to "flash-over" is minimized.

The remaining field windings, with the exception of $F_4$, are connected similarly to the field windings bearing the same designations in Fig. 5 and perform similar functions thereto. The field winding $F_4$ is located in the load circuit and, if connected to provide a cumulative magnetizing effect, will partly counter-balance the effect of the generator field winding $F_3$, which, in that case, may be made of rather large capacity to provide high self-induction in the motor circuit for the above-mentioned purposes. On the other hand, if the field winding $F_4$ is connected to be negative or differential in its magnetizing effect, the compound effect of the generator field winding $F_3$ will be correspondingly increased.

If the field windings $F_3$ and $F_4$ are both excited by the motor current, the tendency of the motors to "flash-over" is still further reduced, in accordance with familiar operating principles. Furthermore, the field winding $F_4$ may be entirely omitted, if desired, and satisfactory operation of the motor-generator set will still be obtained.

The field winding $F_2$ in the systems shown in Fig. 5 and Fig. 6 may also be omitted, provided that the field winding $F'$ is made sufficiently strong in its effect. Fig. 7 illustrates such a system. In this case, the motor armature winding $A^1$ is provided with the field windings $F$ and $F'$, while the generator armature winding $A^2$ has the field windings $F_1$ and $F_3$. If the field winding $F'$ has a relatively heavy magnetizing effect, the speed of the motor, under conditions of decreasing line voltage, will be raised to maintain the desired substantially constant secondary or generator voltage. Furthermore, under such conditions, the field winding $F'$ may also be connected directly across the supply circuit to bring about similar desirable results. On the other hand, if the magnetizing effect of the field $F'$ is just sufficient to maintain a substantially constant motor speed, then satisfactory results may be obtained with the generator self-excited, or, in other words, by connecting the field winding $F_1$ to the terminals of the generator armature winding $A^2$.

Figure 8:
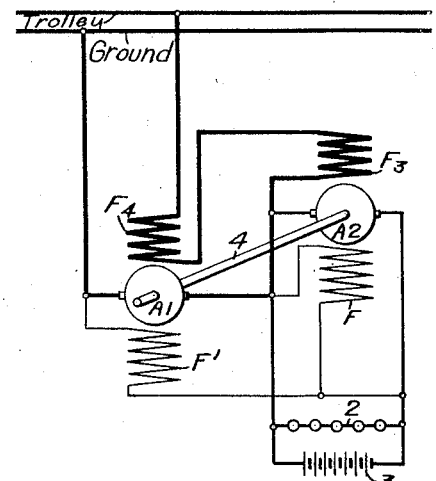

The system shown in Fig. 8 is particularly adapted for providing a relatively low generator voltage in cases where it is not desired to energize a set of five lamps in series, as may be done by the previously-described systems. In Fig. 8, the field windings $F_3$ and $F_4$ for the generator and the motor armature, respectively, are connected in series relation with the motor armature $A^1$ across the supply circuit, while the field winding $F'$ is energized in accordance with the difference between the armature winding voltages, and a shunt field winding $F$ for the generator armature $A^2$ is connected to the terminals thereof. Since, as previously mentioned, the excitation of the field winding $F'$ for the motor armature $A^1$ decreases more rapidly than an accompanying reduction of line voltage, it follows that the motor speed is maintained approximately constant, so that the self-excited generator armature A² will tend to maintain a constant output voltage, as desired.

The series field windings F₃ and F₄, however, are not essential and may be omitted from the system shown in Fig. 8, under which conditions, satisfactory secondary voltage regulation will still be obtained.

Figure 9:
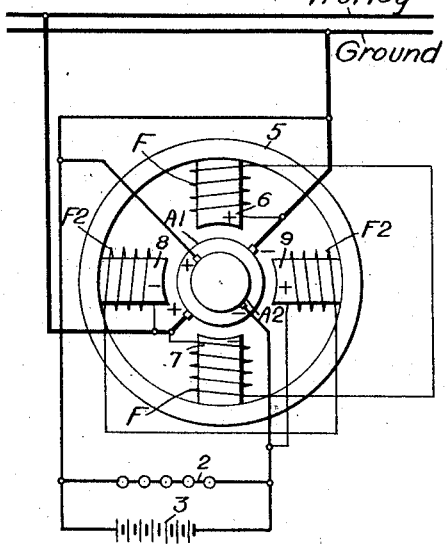
Figure 10:
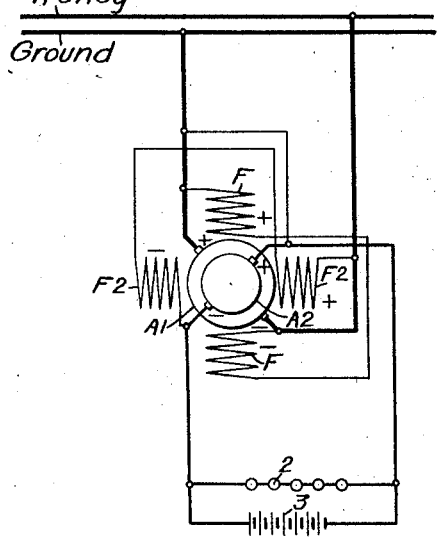

Figs. 9 and 10 illustrate further dynamotor connections, wherein the same general results as those set forth in connection with Fig. 5 are obtained. The motor armature winding A¹ and the generator armature winding A² are again provided with sets of brushes located in quadrature or other suitable angular relation, and a field magnet frame has a plurality of inwardly-extending polar projections 6, 7, 8 and 9 surrounding the dynamotor armature. The field winding F has one terminal connected to the trolley and is wound around opposite polar projections 7 and 6, whence circuit is completed to ground. The remaining field winding F² also has one terminal connected to the trolley conductor and is disposed around opposite polar projections 8 and 9, the other terminal of the field winding F² being connected to the negative brush for the generator armature winding A².

The supply-circuit-excited field winding F thus emits a positive or cumulative flux acting between the motor brushes, whereas the field winding F², which is excited by the difference of the armature voltages, sets up a negative or differential flux between the brushes of the motor armature winding A¹. However, with respect to the generator brushes, the action of both field windings F and F² is positive or cumulative, by reason of the relative positions of the corresponding polar projections and the brushes for the generator armature.

In Fig. 10, the connections for the field windings F and F² are similar to those just described, while the sets of brushes for the respective armature windings have been shifted 90° clockwise from those shown in Fig. 9. The difference between the armature winding voltages, which is impressed upon the field winding F², decreases more rapidly than an accompanying reduction of the supply-circuit voltage, as previously set forth. Since both field windings exert a cumulative effect with respect to the motor brushes in the present system, it follows that the total motor field flux also decreases at a higher rate than the supply-circuit voltage, which action tends to maintain the speed of the dynamotor. With respect to the generator brushes, the field winding F² has a negative or differential effect and, consequently, the total generator field flux increases under conditions of decreasing line voltage, whereby the generator voltage is maintained at the desired value.

If desired, a series field winding may be added on the polar projections 8 and 9 corresponding to the field winding F² or upon the remaining polar projections. Furthermore, the field winding F may be series-excited, or an additional series field winding may be provided and, in either case, satisfactory operating results, whereby substantially constant secondary or generator voltage is provided, will be obtained.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The combination with a supply circuit, of a motor-generator set for transforming the supply-circuit voltage to a lower value, said set having a field winding for each armature thereof energized in accordance with the difference between the voltage impressed upon the motor-generator set from said supply circuit and the delivered voltage of said generator armature winding.

2. A direct-current rotary transformer, adapted to provide substantially constant secondary voltage under conditions of primary voltage variation, comprising a motor armature circuit, a generator armature circuit and a plurality of field windings: a shunt field winding for the motor armature circuit connected to increase the excitation thereof upon an increase of impressed voltage, a field winding for furnishing the major excitation for the generator armature circuit and a shunt field winding for further influencing the generator armature circuit connected to vary in strength directly with the primary voltage and to act in opposition to said field winding furnishing the major excitation.

3. A direct-current rotary transformer, adapted to provide substantially constant secondary voltage under conditions of primary voltage variation, comprising a motor armature, a generator armature driven thereby, and a plurality of field windings: a field winding for the motor armature connected to vary the excitation thereof directly with the impressed voltage, a second field winding for furnishing the major excitation for the generator armature, and a shunt field winding for further exciting the generator armature connected to vary in strength directly with the primary voltage and to act differentially to said second field winding.

4. The combination with a motor armature winding and a generator armature winding driven thereby, of a plurality of field windings for the respective armature windings connected between them and in series relation therewith, and a plurality of other field windings connected in parallel relation to the motor armature winding to respectively act cumulatively in the case of that armature winding and differentially in the case of the generator armature winding.

In testimony whereof, I have hereunto subscribed my name this 6th day of June, 1919.

RUDOLF E. HELLMUND.